(12) United States Patent
Adams et al.

(10) Patent No.: US 6,429,852 B1
(45) Date of Patent: *Aug. 6, 2002

(54) ERGONOMIC INPUT DEVICE (75) Inventors: Aditha M. Adams; Steven T. Kaneko, both of Seattle; Carl J. Ledbetter, Lynwood; Hugh Edward McLoone, Jr., Bellevue, all of WA (US); Stanley Hiroshi Wada, Tarzana, CA (US); John Richard Arbak, Seattle, WA (US); Edward V. Cruz, Newbury Park, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/472,481

(22) Filed: Dec. 27, 1999

Related U.S. Application Data (62) Division of application No. 08/866,868, filed on May 30, 1997, now Pat. No. 6,031,518.

(51) Int. Cl.$^7$ ................................................. G09G 3/02
(52) U.S. Cl. ..................... 345/163; 345/156; 345/157; 345/158; 345/159; 345/160; 345/167
(58) Field of Search .................................. 345/156, 163, 345/167, 157–160

(56) References Cited

U.S. PATENT DOCUMENTS

| 3,835,464 A | 9/1974 | Rider | 340/324 |
|---|---|---|---|
| 4,559,532 A | 12/1985 | Hosgoe | 340/710 |
| 4,562,314 A | 12/1985 | Hosgoe et al. | 200/512 |
| 4,613,853 A | 9/1986 | Hosgoe et al. | 340/710 |
| D288,930 S | 3/1987 | Barbera et al. | D14/114 |
| D291,318 S | 8/1987 | Kim | D14/114 |
| 4,754,268 A | 6/1988 | Mori | 340/710 |
| 4,786,892 A | 11/1988 | Kubo et al. | 340/365 |
| 4,806,917 A | 2/1989 | Hosgoe | 340/710 |
| D302,426 S | 7/1989 | Bradley et al. | D14/114 |
| 4,862,165 A | 8/1989 | Gart | 241/20 |
| 5,252,970 A | 10/1993 | Baronowsky | 341/20 |
| 5,414,445 A | 5/1995 | Kaneko et al. | 345/163 |
| 6,031,518 A | * 2/2000 | Adams et al. | 345/156 |

FOREIGN PATENT DOCUMENTS

| EP | 348 153 | 12/1989 |
|---|---|---|
| EP | 90 10 7674 | 12/1990 |

OTHER PUBLICATIONS

Scios Calam Mouse, Natürliche Maus–Bedienung, 1 page, Jan. 1992.
Lewis, Peter H., "Building a Better Mouse", *New York Times*, 1 page, Feb. 1991.
Tessler, Franklin N., "Input Alternatives", *MACWORLD*, Jun., 1992, pp. 155–159.

(List continued on next page.)

*Primary Examiner*—Bipin Shalwala
*Assistant Examiner*—Vincent E. Kovalick
(74) *Attorney, Agent, or Firm*—Christopher L. Holt; Westman, Champlin & Kelly, P.A.

(57) ABSTRACT

The device comfortably supports the hand of the user while the thumb and fingers are associated with keys, a trackball, and a scrolling wheel carried on the device. The overall configuration of the device and the arrangement of these actuators permits the user to operate all of the functions provided by the actuators while the forearm is in a neutral posture zone between pronation and supination of the forearm, and the wrist and fingers are minimally extended and comfortably flexed, respectively.

26 Claims, 7 Drawing Sheets

OTHER PUBLICATIONS

Gruman, Galan, "What Price Mice?", *INFOWORLD*, Apr. 23, 1990, pp. 63–65, 68–69, 72.

Lusty & Spector, "Keyboards, Mice, and Trackballs, with the Personal Touch", *PC World*, Jun., 1990, pp. 160–170.

Yacco, Wayne, "New Alternative Mac Pointers: Pointing to the Future?", *Computer Shopper*, Dec., 1990, pp. 568–571, and 574.

Bermant, Charles, "The Mouse that Roared", *Power*, 2 pages, Jun. 1991.

Zelnick, Nathaniel, "Alternative Input, Mice and Trackballs", *PC Magazine*, Aug., 1990, 4 pages.

Rice, Lorraine, "mice vs. Trackballs: The Anatomy of a Choice," *PC Magazine*, Aug., 1990, pp. 216–217.

Sullivan, Kristina B., "Mice Find Their Niche in Graphical Environments", *PC Week: Buyer's Guide*, Sep. 9, 1991, 3 pages.

"Makers Offer a Divers Range of Mice", *Computer Products*, Oct., 1990, 22 pages.

"Logitech™ Series/2 Mouse", Logitech Advertisement, 4 pages circa 1/1996.

Hodes, Diane and Akagi, Kenichi, "Study, Development, and Design of a Mouse", Digital Equipment Corporation, Abstract, pp. 900–904, 1986.

Hodes, Diane, "Research and Design of a Mouse", Digital Equipment Corporation, pp. 321–326, 1987.

KM Mouse for Windows, one–page brochure, circa 1/1996.

Mack, Robert and Montaniz, Frank, "A Comparison of Touch and Mouse Interaction Techniques for a Graphical Windowing Software Environment" Proceedings of the Human Factors Society 35$^{th}$ Annual Meeting—1991, pp. 286–289.

Mahach, Karen Renee, "A Comparison of Computer INput Devices: Linus Pen, Puse, Cursor Keys and keyboard", George mason University, Abstract, pp. 330–333, 1989.

Verplank, Bill & Oliver, Kate, "Microsoft Mouse: Testing for Redesign", proceedings of Interface 89, pp. 257–261, 1989.

Packaging illustration and descriptive material from Logitech TrackMan® Vista™ packaging, 3 pieces, 1/1994.

Computer City Advertisement Insert, pp. 15–19 (Note p. 15), circa 1/1997.

User's Guide from *Logitech™ Mouse and Trackball*, 24 pages, Circa 1/1997.

\* cited by examiner

ERGONOMIC INPUT DEVICE

This is a division of application Ser. No. 08/866,868, filed May 30, 1997 now U.S. Pat. No. 6,031,518.

FIELD OF THE INVENTION

This invention relates to an ergonomically designed computer input device.

BACKGROUND AND SUMMARY OF THE INVENTION

Computer input devices for entering commands into a computer are well known and currently available in a variety of configurations. Many such input devices include a rotatable ball mounted to the base of the device. As the ball is moved relative to the base, transducers sense the movement of the ball and generate signals indicative of the direction and amount of that movement. The signals are used, for example, to control movement of a cursor on the screen of a computer.

A type of input device known as a "mouse," houses the rotatable ball so that it extends from the underside to frictionally engage a work surface, such as a desktop. The movement of the mouse along the work surface causes rotation of the ball for generating the signals that are converted to cursor movement on the computer screen. A trackball-type input device, on the other hand, has its rotatable ball exposed for manipulation by the user's finger(s) and/or thumb. Similar ball-position signals are generated.

Computer input devices also include keys. Depressing one of the keys changes the state of an associated switch, which permits a user to enter various commands into the computer. The nature of the command usually depends upon the position of the cursor on the screen.

One mouse-type pointing device, available from Microsoft Corporation under the trademark IntelliMouse, includes a roller or wheel that protrudes from the top of the device and is coupled to a transducer for producing a signal indicating the rotation of the wheel. That signal may be used, for example, for scrolling through a window displayed on a computer, which function was heretofore performed by moving the cursor to the window "scroll bar" and depressing a key as needed to scroll through whatever is displayed in the window. For convenience, the wheel will be hereafter referred to as a "scrolling wheel." The keys, trackball, and scrolling wheel may be collectively referred to as the actuators carried on the input device.

Irrespective of the type of input device employed, mouse or trackball, it is important that the device be comfortable for the user to operate, especially over long periods of time. Such comfort is obtained by careful attention to ergonomic factors, particularly toward minimizing stress in the user's fingers, wrist, and forearm. Providing a comfortable computer input device can be especially challenging when one's design goal includes enhancing the function of the device over what went before, such as by combining, along with keys and a trackball, an actuator like the aforementioned scrolling wheel.

The present invention is directed to an ergonomic input device that comfortably supports the hand of the user while the wrist is minimally extended and the thumb and fingers are oriented in neutral postures for operation of the actuators carried on the device. The overall configuration of the device and the arrangement of these actuators permits the user to carry out all of the functions provided by the actuators while the forearm is in a neutral posture zone, between pronation and supination of the forearm.

More particulary, the base of the device is shaped so that the metacarpal-phalangeal joint ridge is supported, as is the remainder of the user's palm. In this regard, the palm is considered here to comprise the metacarpal-phalangeal joint ridge (which, for the present, can be thought of as the area where the fingers are jointed to the end of the palm), the thenar eminence (the mound of the palm at the base of the thumb), and the central region of the palm that defines what is known as the palm gutter.

The size and shape of the device is such that a wide range of hand sizes will be comfortably supported in using the device, including those hand sizes falling within a range defined by the fifth percentile female (small hand) to the ninety-fifth percentile male (large hand) of North American adults.

The actuator arrangements and shape of the device also minimizes extension of the wrist and fingers. Abduction and adduction of the fingers is also minimized.

Moreover, the actuators are located such that the primary actuator (trackball) is oriented for manipulation by the finger with the greatest dexterity; namely, the index finger. Secondary functions, such as depressing the keys ("clicking") and operating the scrolling wheel are assigned to the slightly less dextrous digits, the thumb and middle finger, respectively. The even less-dextrous ring finger and little finger are not associated with any actuators but are instead comfortably supported by the base of the device, in a manner that facilitates a comfortable overall grip or feel of the device and act as resistance to button activation force vectors by the thumb.

The foregoing and other features and advantages of the preferred embodiments of the present invention will be more readily apparent from the following detailed description, which proceeds with reference to the accompanying drawings.

DETAILED DESCRIPTION OF PREFERRED EMBODIMENTS

Figure 1:
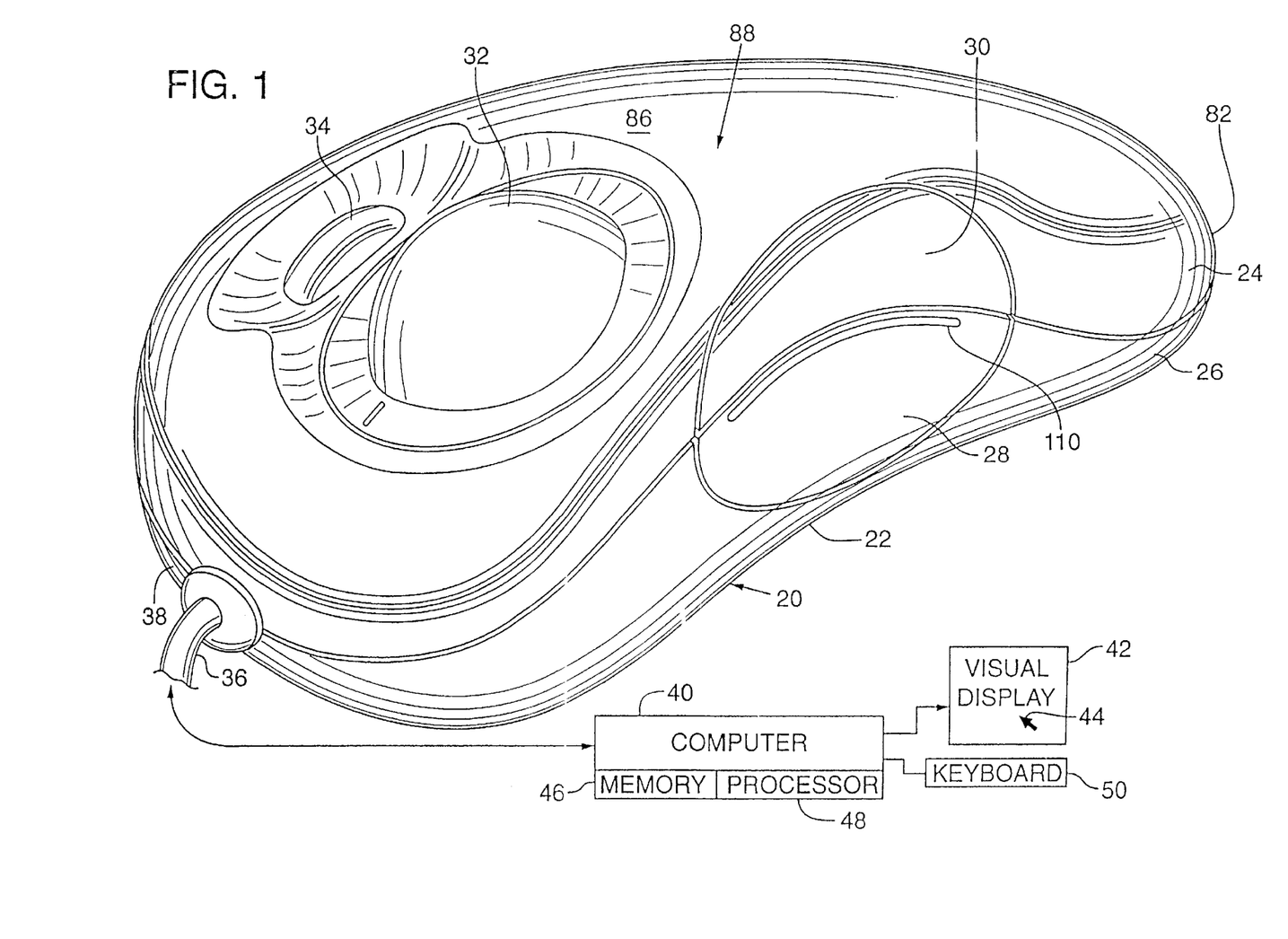
FIG. 1 is a perspective view of a right-handed version of an ergonomic input device in accordance with the present invention, also depicting a diagram of a computing system with which the device may be employed.
Figure 3:
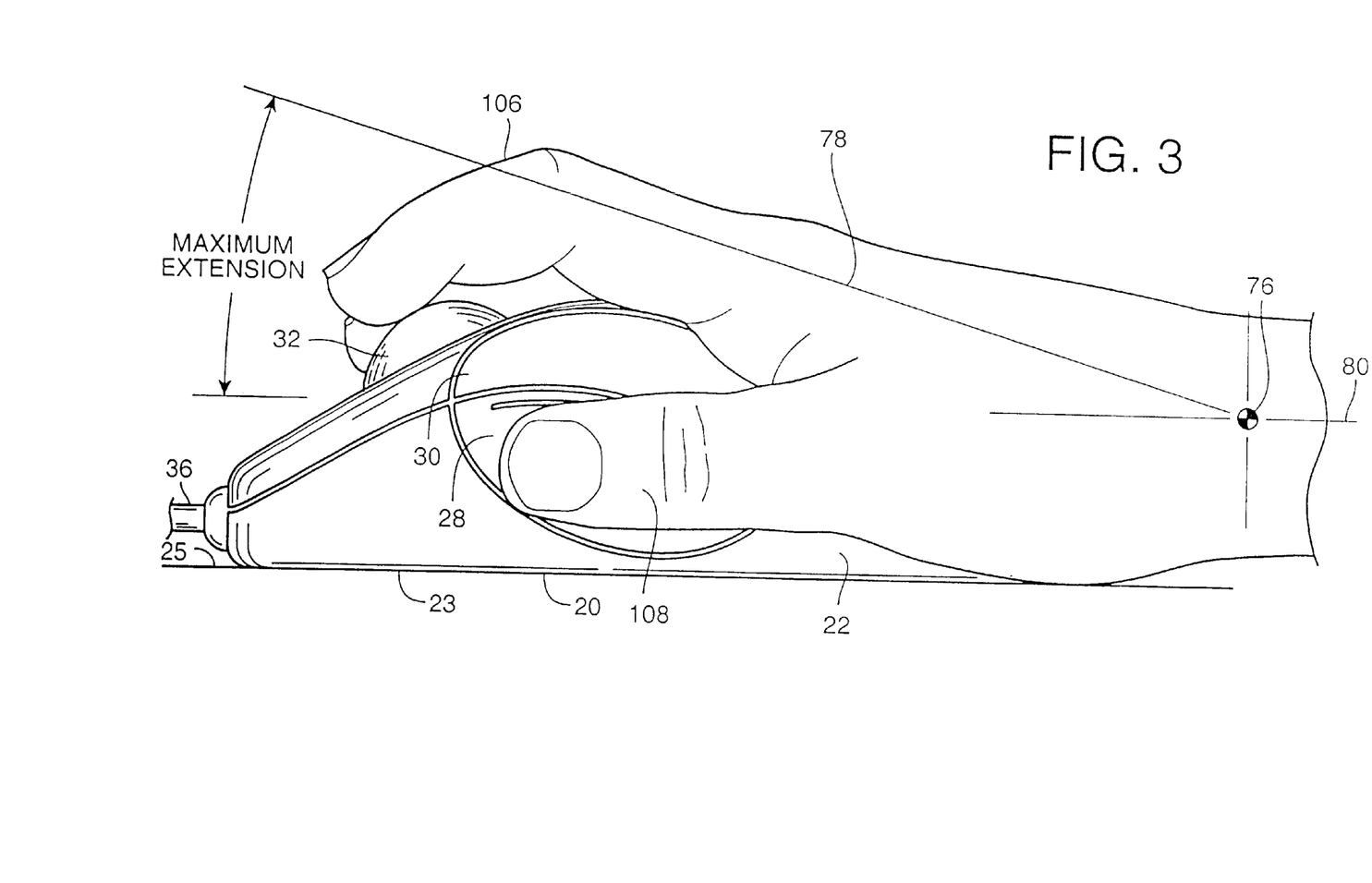
FIG. 3 is a side elevation view showing one, "inner," side of the device, including a user's hand positioned for operating the device.

FIGS. 1 and 3 depict an ergonomic input device 20 configured in accordance with the present invention. The device includes a base 22 having a flattened bottom 23 (FIG. 3) for resting on a planar work surface, such as a desktop 25. In a preferred embodiment, the body 22 includes an upper housing 24 that is joined to a lower housing 26. Four independently-operated actuators are carried by the body, including a primary key 28, a secondary key 30, a trackball 32, and a scrolling wheel 34.

The primary key 28 and secondary key 30 may be depressed. A switching function is carried out by depressing each key, like that function performed by a conventional mouse when one depresses or "clicks" a key. Specifically, depressing either of the keys 28, 30 changes the associated switch state and generates a signal that is conveyed via conductors in a cord 36 to a computer 40. One end of the cord 36 is anchored inside of the device body 22. The cord emanates from the front or distal end 38 of the device, and the other end of the cord is coupled with the computer 40.

The computer 40 may be any of a multitude of designs and includes a visual display device 42. The device 42, which may be a cathode ray tube-type, active matrix display, or other suitable device, can display a cursor or pointer 44, along with text and other graphic information. The computer also includes storage or memory 46, a processor 48, and a keyboard 50.

The trackball 32 is mounted for rotation about any axis. Encoders housed within the base 22 detect the motion of the trackball and convey signals via cable 36 to the computer in a conventional manner. Those signals may be employed, for example, for moving the pointer 44 across the display 42.

The scrolling wheel 34 may be of the type embodied in the previously mentioned product produced by Microsoft Corporation under the trademark IntelliMouse. More particularly, the wheel 34 is supported on an axle that resides within the body 22 of the input device. That axle is carried by spaced-apart axle supports. The axle supports are configured to allow one end of the axle to move in a direction that is generally perpendicular to the axis of rotation of the wheel, so that the wheel may be depressed, slightly tilting its axle to activate a switch. A spring is contained within the housing and arranged to resist depression of the wheel.

An optical encoder may be positioned on the axle for rotation with the wheel. A light source and a light sensor may be mounted within the device so as to sense the motion of the optical encoder to provide a positioning signal. The switch that is engaged as a result of depression of the wheel, provides a switching signal. A detent mechanism may also be provided on the axle to provide a segmented feel to the rotation of the wheel. The wheel position and switch signals are conveyed via the cable 36 to the computer for effecting changes on the visual display, such as scrolling, etc.

Figure 2:
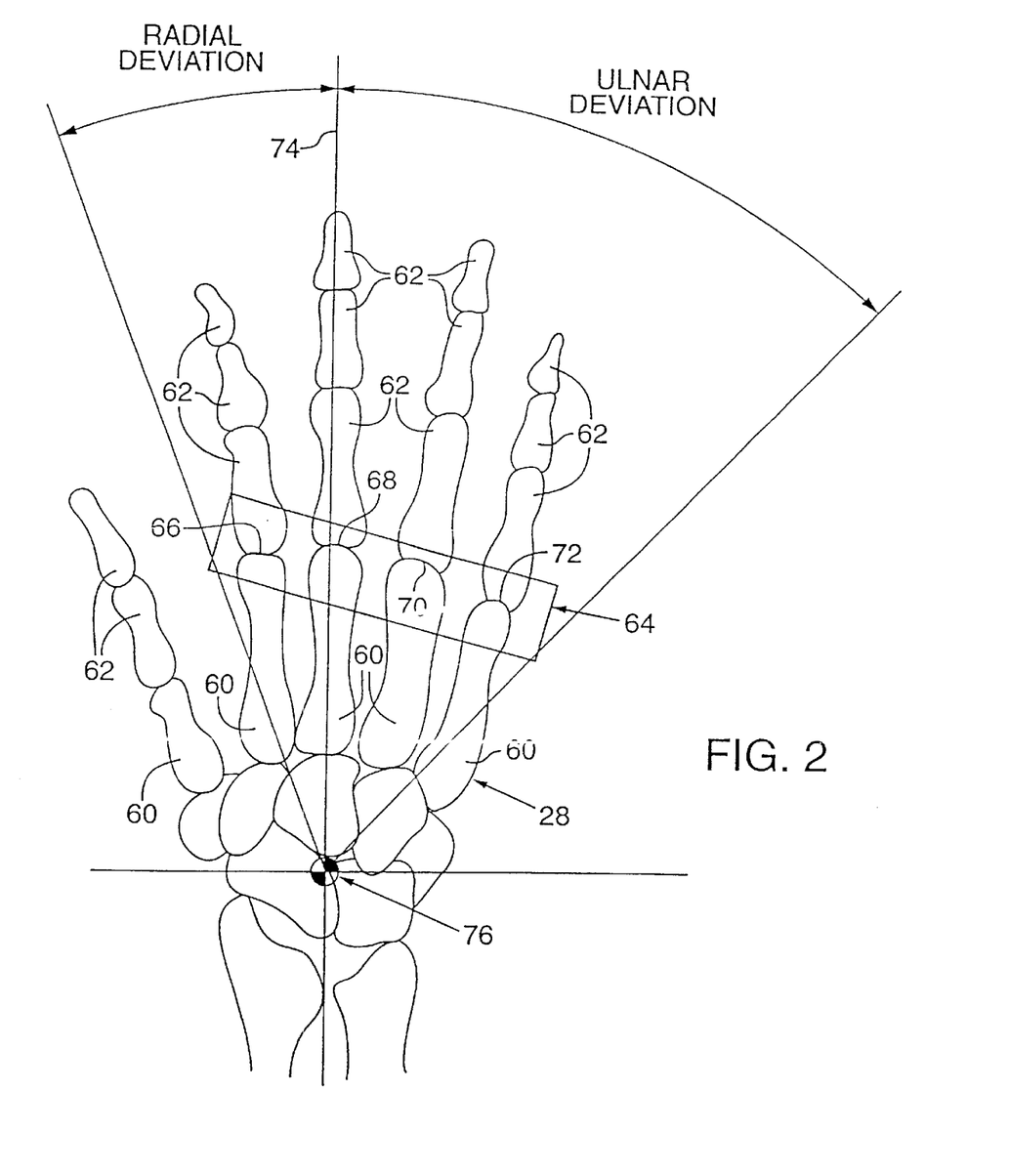
FIG. 2 is a diagram of a right-hand skeleton from a top plan view.

Before proceeding with the ergonomic and associated characteristics of the input device of the present invention, it will be worthwhile to overview concepts and terminology of interest. This is accomplished in part by reference to FIGS. 2 and 3. Shown in FIG. 2 are the five major hand bones radiating from the wrist area, which are known as the metacarpals 60. The finger bones number fourteen in each hand and are designated phalanges 62. It is noteworthy here that although the embodiment under consideration represents a right-hand input device, a mirror image, left-hand version of the device may be readily provided by reference to the following description. Accordingly, a right hand is depicted in FIGS. 2 and 3. In this description, the particular fingers will carry conventional designations; namely, from right to left in FIG. 2, the thumb, and the index, middle, ring, and little fingers.

Where each finger meets the palm or, more precisely, where the metacarpal bones 60 and phalangeal bones 62 of the fingers join, there are defined metacarpal-phalangeal joints 66, 68, 70, 72. A metacarpal-phalangeal ridge 64 is defined by the portion of the hand in the vicinity of these four joints. Thus, the ridge 64 includes the second (finger) metacarpal-phalangeal joint 66, the third 68, fourth 70, and fifth 72, as depicted in FIG. 2. As will become clear upon reading this description, the input device of the present invention is configured to support the metacarpal-phalangeal joint ridge 64 so that the user's hand and arm remain comfortable, and the thumb, index and middle fingers may comfortably manipulate associate actuators.

The ranges and specific dimensions for the embodiment described herein were arrived at through the use of anthropometric data, biomechanics and observation-based methodology. Given, however, that most of the edges and surfaces of the preferred embodiment are curved, it will be appreciated by one of ordinary skill in the art that ordinary measurements taken from or to a curved edge are accurate within a range of about 1 millimeter, and minor deviations from the stated ranges or dimensions will not adversely affect the ergonomic advantages provided.

Ergonomic criteria for each point of contact between the user and the input device is quantified and incorporated such that the user may grasp and use the device in a biomechanically neutral position. Such a neutral position is achieved when the flexors and extensors of the user's hand and wrist are in equilibrium, where intracarpal pressure is minimized and flexors and extensor muscles are positioned for optimal application of strength. A biomechanically neutral zone is achieved when the user's forearm is between pronation and supination and, as respects the wrist, when the user can control the device with the wrist not exceeding a maximum extension of about 10 degrees, a maximum radial deviation of about 26 degrees, and a maximum ulnar deviation of about 45 degrees. As illustrated in FIG. 2, with a hand on a flat surface, radial deviation is rotation of the wrist toward the thumb and ulnar deviation is rotation of the wrist toward the little finger. Both deviations are measured relative to the axis 74 passing through the center of the wrist joint 76.

As illustrated in FIG. 3, wrist extension is measured as an acute angle created by an inclination of the hand plane 78 relative to a horizontal axis 80 passing through the center of the wrist joint 76. The hand plane 78 is defined as that plane within which reside the second through fifth metacarpal bones:

The present invention provides an ergonomic input device that will accommodate hands sized within a range of a fifth percentile female to a ninety-fifth percentile male, considering North American adults. Alternatively, users having hands falling outside of this design range may still enjoy the advantages of the invention, by appropriately scaling up or down the configuration of the present embodiment.

Figure 5:
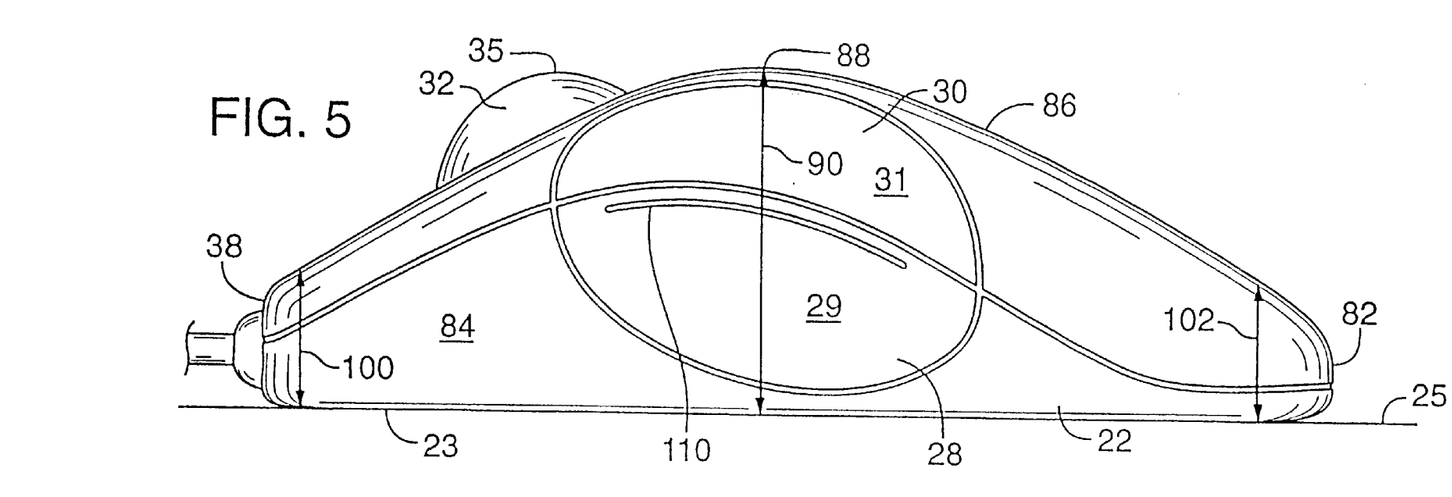
FIG. 5 is a side elevation view, like FIG. 3, but without user's hand.

With particular reference to FIGS. 1, 3, and 5, the base 22 of the device 20, which may be formed of rigid plastic, has a flattened bottom 23 that rests on a surface 25 while being operated. That is to say, the device is intended to be stationary during use, no positional signals are generated as a result of moving the body of the device relative to the surface 25. Nevertheless, the device is shaped to be comfortably gripped by the user while changing its position on the desktop to suit the user. During use, the overall device is comfortably felt between the thumb and little finger, as will be explained.

With particular reference to FIG. 5, the base 22 includes a proximal end 82 and a distal end 38. In a preferred embodiment, the overall length of this device is about 150 millimeters. The side of the device appearing in FIG. 5 is hereafter designated the inner side 84, and is the side that carries the thumb-contacted keys 28, 30 as discussed more fully below.

Along the top of the device, the inner surface 84 joins an upper surface 86. The device is configured so that between the proximal end 82 and the distal end 38 the device is thickest in the region just slightly distal from (that is, to the left in FIG. 5) the mid-point between the proximal end 82 and distal end 38. This thickness is preferably about 48 millimeters and is represented by dimension line 90, measured in a direction perpendicular to the flattened bottom 23 of the device.

Figure 9:
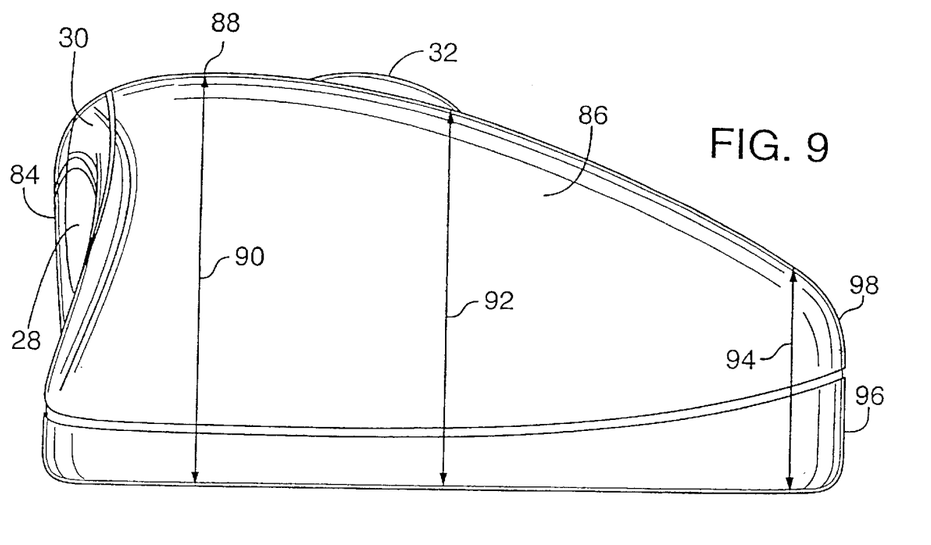
FIG. 9 is a back elevation view of the device.

As respects a front elevation view and back elevation view (see FIGS. 9 and 10) this thickest part of the device 20 is adjacent to the inner side 84 of the device. The portion of upper surface 86 associated with this thickest part is designated as a crest 88 from which the thickness of the device gradually diminishes in a direction away from the crest 88.

Considering the profile provided by the back elevation view (FIG. 9), the thickness diminishes gradually along a negative-sloped upper surface curve so that the thickness of the device at the midpoint, appearing as dimension 92, is about 43 millimeters. From that location, in the direction away from the crest 88, the profile slope diminishes somewhat more rapidly such that, at a location shown as dimension 94, which is very near the junction of the upper surface 86 and the outer surface 96, the thickness of the device is about 23 millimeters.

Figure 4:
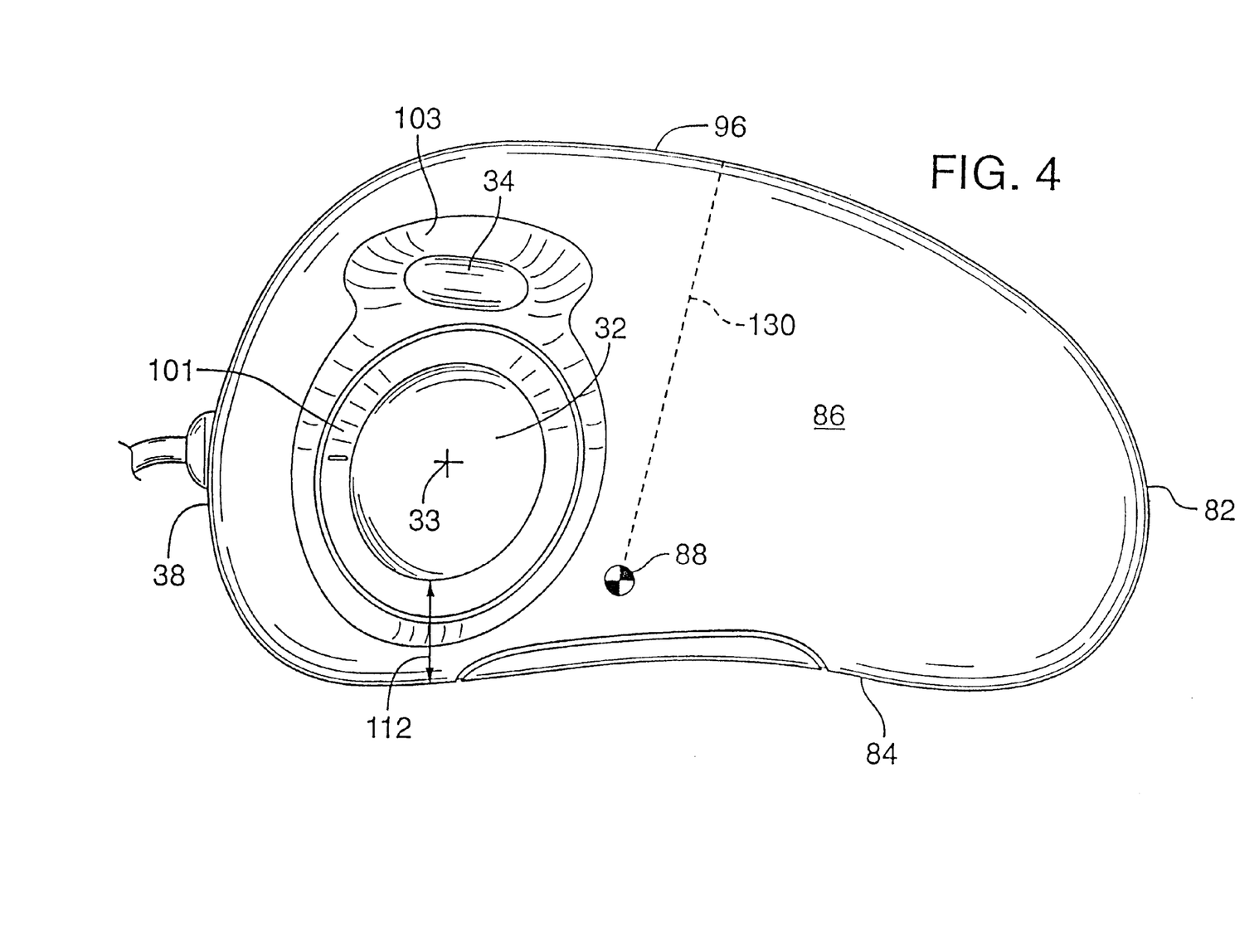
FIG. 4 is a top plan view of the device.

The junction of the upper surface 86 with the inner surface 84 and the junction of the upper surface with the outer surface 96 (for that matter, the entire periphery of the upper surface 86) is gently rounded so that no sharp edges are presented to the user, which edges would introduce uncomfortable pressure ridges when the device is operated as explained below. In this regard, the peripheral edge of the upper surface, which is depicted as immediately adjacent the perimeter line appearing in FIG. 4, is shaped to have a radius of no less than about 3 millimeters along the junction of the top surface 86 with an associated side. Such a radius is shown at 98 in FIG. 9.

With reference to FIG. 5, the thickness of the device is such that there is defined in the profile of the device (FIG. 5) a negative-slope curve having a high point at the crest 88 and diminishing gradually to a height, shown as dimension 100, of about 18 millimeters adjacent to where the upper surface 86 of the device joins the distal end 38 of the body 22. Similarly, the profile of the device from the crest 88 in the direction toward the proximal end 82 diminishes in a negative-slope curve to a dimension 102 adjacent to where the upper surface 86 joins the proximal end 82 of the device. The thickness 102 is about 18 millimeters.

The trackball 32 is a sphere, preferably having a diameter of 38 millimeters, and is mounted to the body so that its center 33, as viewed in plan (FIG. 4) is located midway between the crest 88 and the distal end 38 of the device. This optimal placement corresponds to the distance from the crest 88, where support is provided to the metacarpal-phalangeal ridge 64, to the center 33 of the trackball in order to be actuated by the tip of the index finger 106 (See FIG. 3) of any hand falling within the range of sizes from a small, fifth percentile female hand to a large, ninety-fifth percentile male, among North American adults.

Figure 10:
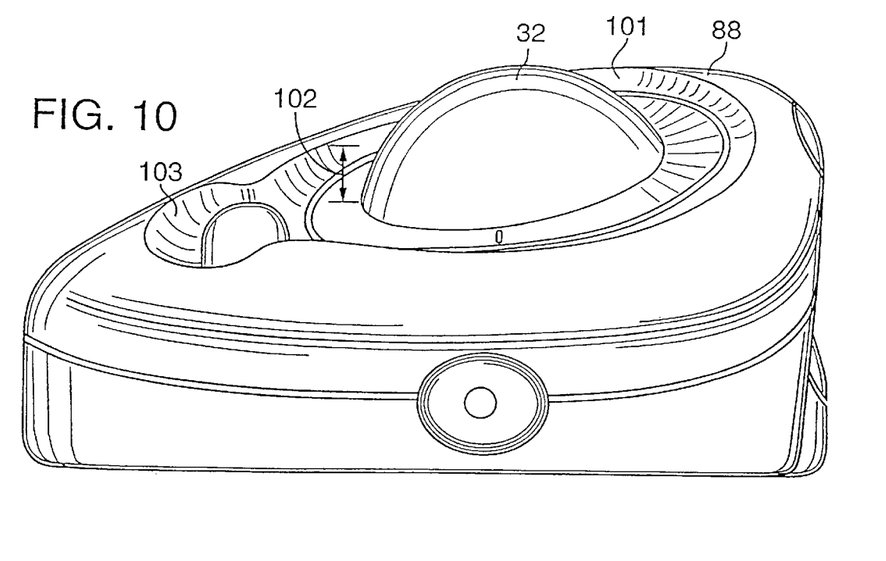
FIG. 10 is a front elevation view of the device.

As shown best in FIGS. 1 and 10, the portion of the upper surface 86 of the device 20 surrounding the trackball 32 is recessed. The depth of this recess 101 from the surface, as measured from the junction of the recess and the ball (along a tangent to the ball) is about 5–7 millimeters, as shown as dimension 102 in FIG. 10. Substantially an entire hemisphere of the trackball 32 is exposed for manipulation by the index finger 106 of the user, as will be explained.

Figure 6:
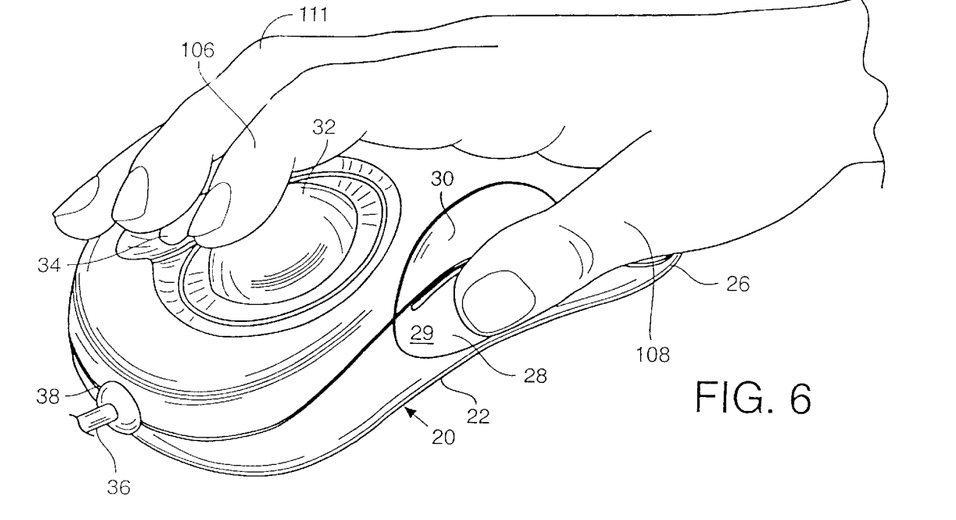
FIG. 6 is a perspective view of the device showing a user's hand with fingers associated with the respective actuators.

With reference to FIGS. 3 and 6, the device 20 is shown with the user's hand placed in a position for operating the device. In such a position, the region of the user's hand underlying the second metacarpal-phalangeal joint rests upon or is supported immediately adjacent the crest 88 of the upper surface 86. The index finger 106 is comfortably flexed so that its tip contacts and is able to manipulate the trackball 32. In this regard, the trackball is spaced a minimum distance from the crest 88 of the upper surface 86 to facilitate operation of the trackball by moving the index finger through a comfortable range of flexion and extension from a neutral, slightly curled position. In a preferred embodiment, this distance, as measured from the crest 88 to the nearest point on the trackball 32, is about the distance corresponding to the radius of the trackball. Alternatively, the trackball could be comfortably located at a distance of about one and one-half radii, although the one-radius distance is preferred.

As noted above, the preferred size of the trackball is about 38 millimeters in diameter. The just described crest-to-distance spacing (that is, as related to trackball radius) would vary accordingly were a larger or smaller trackball employed.

The elevation of the top 35 of the trackball 32 (FIG. 5) is such that it is about the same as or slightly lower than the thickness of the device at the crest 88. This relationship between the height of the trackball and the crest 88 provides the advantage of reducing the extension of the wrist and index finger that would otherwise be required if the top of the trackball were above the crest of the device. In a preferred embodiment, the top 35 of the trackball is 46 millimeters above the flat bottom 23 of the base 22, 2 millimeters below the crest 88.

The above-mentioned recess 101 that surrounds the trackball 32 (FIG. 10) permits exposure of the entire hemisphere of the trackball 32 at a height, as measured perpendicularly from the flattened part of the base, that is relatively lower than would be the case if the hemisphere of the trackball were exposed without a surrounding recess. Put another way, the recess plays a role in the ergonomic advantages of reducing the extension of the user's index finger.

Turning now to consideration of the keys 28, 30 mounted on the inner surface 84 of the device, and with particular reference to FIGS. 3, 4 and 5, it is noteworthy that each key is defined in part by a contact surface 29, 31 against which is pressed the thumb 108 of the user to actuate the underlying switch. The contact surface 29 of the first or primary key 28 is shaped so that the surface normally (that is, when the key is not depressed) is flush with the slightly concave portion of the inner surface 84 that surrounds it. The surface 29 is concave.

A thin, slightly protruding ridge 110 provides a distinctive tactile feel, thereby allowing a user to distinguish between the primary key 28 and the secondary key 30 without viewing those keys. In the preferred embodiment, the primary key and the switching associated with it may be assigned functions that are normally assigned to the left key of a right-handed mouse, which means that under normal circumstances, the primary key 28 would be actuated more often than the other, secondary key 30. Thus, the area assigned to the primary key 28 is preferably relatively larger than the area assigned to the secondary key 30. The contact surface 29 of the key 28 is shown between the intersecting arcs that surround the key.

Inasmuch as the contact surface 29 of the key 28 is flush with the inner surface 84 of the device, one will appreciate that the user's thumb 108 will be readily moved between the primary key 28 and the secondary key 30 (compare FIGS. 3 and 6) with practically no extension of the thumb. That is, the thumb need not be moved away from the side surface of the device in order to move into contact with a key, which movement would be necessary if the key, for example, were protruding from the inner surface. As a result, access to either key occurs with comfortable side to side (lateroflexion) motion of the thumb 108. Depression of the keys occurs with slight flexion of the thumb. Thus, the access and actuation of the keys by the user's thumb are within the expected range of thumb motion for a wide range of hand sizes. Moreover, the slight concave shape of the contact surfaces 29, 31 conforms to the convex shape of the user's thumb, thereby ensuring that practically no extension of the thumb is required in moving from key to key.

Yet another advantage of the ergonomic configuration of the device can be best appreciated while considering the view of FIG. 4, the top plan view. In this regard, the trackball 32 is mounted to be near the inner side 84 of the device body 22. The closeness of the side surface (hence, the keys 28, 30 contacted by the thumb) and the trackball 32 minimizes the abduction of the thumb and index finger required to respectively operate the keys and trackball. Put another way, the angle between the thumb and index finger is minimized with this configuration. In a preferred embodiment, the nearest point of the trackball 32 to the extension of the surface (the dimension 112 shown in FIG. 4) is no more than the distance corresponding to one and one-half radii of the trackball 32. Preferably, this distance measures about one such radius.

The scrolling wheel 34 is mounted next to the trackball 32 away from the inner side 84 of the device. In plan view (FIG. 4) the wheel 34 presents a regular ellipse shape. The wheel is mounted in the downwardly sloping distal part of the upper surface 86 of the device, and is surrounded with a recess 103 having a maximum depth, where the surface is adjacent to the wheel, matching that of the recess surrounding the trackball. The recess 103 surrounding the wheel 34 enables a given portion of the wheel to be exposed for contact (in a preferred embodiment, about the top one-third height of the wheel) at an elevation lower than would be the case if the wheel were mounted without a surrounding recess. In a preferred embodiment, the top of the wheel is about 30 millimeters above the flattened surface of the device, as measured along a line perpendicular to that surface.

The recess 103 surrounding the wheel 34 is contiguous with the recess 101 surrounding the track ball 32. As a result, the user's index finger 106, which is comfortably assigned to rotating the trackball 32, or middle finger 111, which is comfortably assigned to rotating the wheel 34, can be moved back and forth between the wheel and the trackball without contacting the upper surface as might be the case if there were a bridging, non-recessed portion of the upper surface between the wheel and the trackball. The contiguous recesses, therefore, facilitate the abduction and adduction of the index finger as it moves between the trackball and the wheel or the middle finger as it moves between the trackball and the wheel, as the user prefers.

Figure 7:
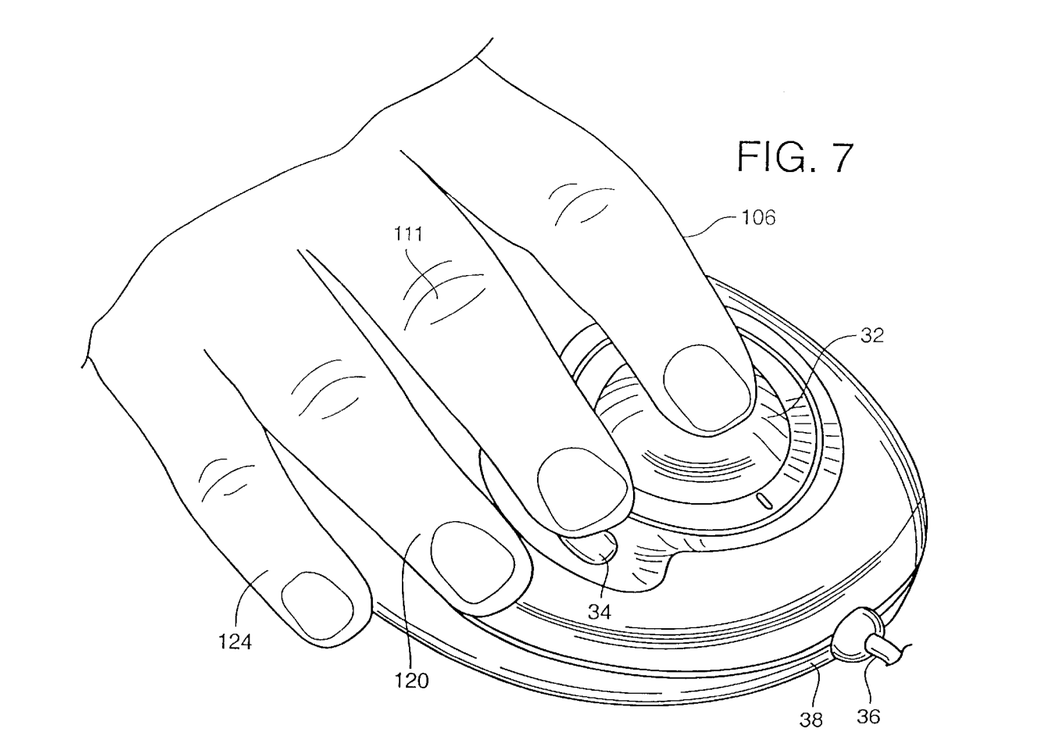
FIG. 7 is another perspective view of the device, which view best illustrates the preferred positional assignments of the user's ring and little finger.
Figure 8:
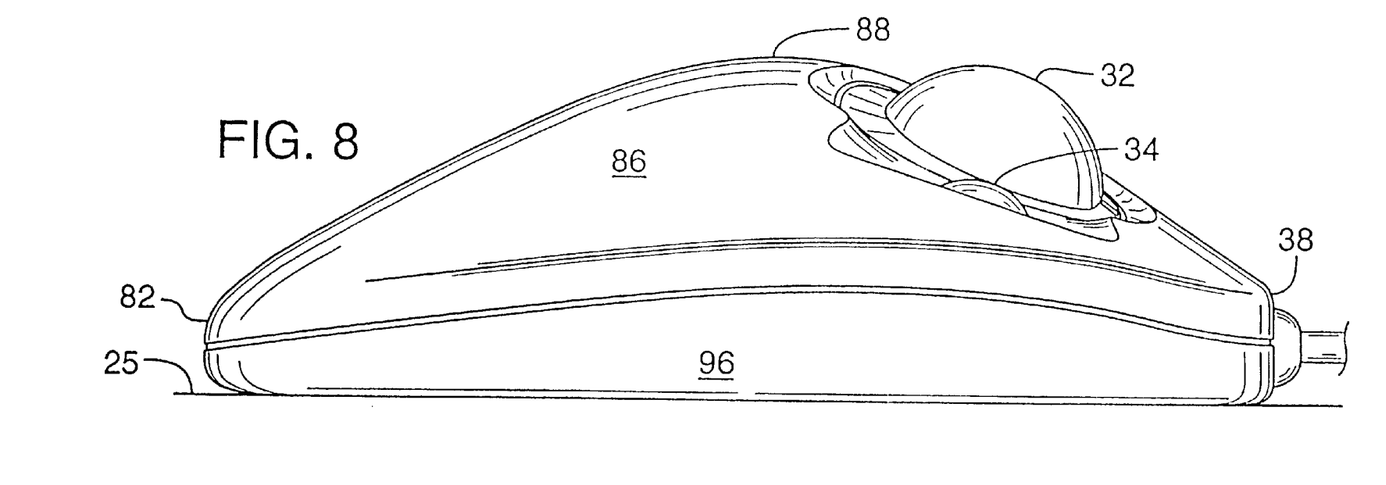
FIG. 8 is a side elevation view of the outer side of the device, which is opposite the inner side.

As noted, the finger with the greatest fine motor control and speed, the index finger 106, will rest with its tip comfortably contacting the trackball 32 while the tip of the middle finger engages the wheel 34. The ring finger 120 is not intended to be employed for moving any of the actuators carried by the device. In this regard as shown in FIGS. 4 and 7, the device is shaped so the upper surface 86 includes a smooth, generally upward facing portion between the wheel 34 and the outer surface 96 that is of sufficient width to support the ring finger 120 while the device is being operated (that is, while the thumb, index, and middle fingers attend to the actuators).

The user's little finger 124 drapes comfortably along the outer side 96 of the device (FIG. 5). The user's ring finger 120 sits comfortably along the curved or "radiused" edge of the outer side of the device and thus may be moved along the outer side 96 of the device as desired or needed by the user. Thus, the little and ring fingers fit over a portion of the outer surface that is roughly parallel to the opposing inner surface portion of the device. As a result, the device 20 resides between the thumb and the little and ring fingers during use, or when being repositioned on the desktop, and provides a very comfortable grip or "feel" for the user.

The height of the outer surface 96 is such that the tip of the little finger 124 may contact both the outer surface 96 and the desktop surface 25 with the finger slightly curled and with very little abduction of that finger. The contact of the little finger tip and the desk provides the user with a tactile "anchor" of the device on the desktop.

The foregoing finger/actuator assignments provide easy finger motion for moving those particular actuators. This ease and comfort is attributable in no small part to the nature in which the user's palm is supported by the proximal part of the upper surface of the device (that is, the area between the crest 88 and the proximal end 82 between the inner side 84 and outer side 96).

As pointed out earlier, one can consider the crest 88 as the area datum on or near which the region underlying the user's second metacarpal-phalangeal joint is supported by the surface 86. Put another way, the crest 88 can be considered an ergonomic datum point or area providing a strong visual cue (in combination with the arrangements of the keys, trackball, and wheel) for where the user is to place the palm for most comfortable and efficient use of the device.

For smaller hands, such as a fifth percentile, North-American female hand, the operating position of the palm will be such that the region underlying the second metacarpal-phalangeal joint will rest nearly directly over the crest. Larger hands, such as a ninety-fifth percentile, North-American male, will engage the device so that the region underlying the second metacarpal-phalangeal joint rests slightly away from the crest 88 in a direction toward the proximal end 82 of the device. It will be appreciated that in the drawings accompanying the present description a relatively large hand is depicted.

Irrespective of the size of the hand operating the device 20, exposed upper surface 86 between the proximal end 82 and the trackball 32 is configured to support the metacarpal-phalangeal ridge 64, as mentioned above, so that the user's forearm is in the neutral zone between pronation and supination. In this regard, a dashed line 130 is depicted in FIG. 4 to illustrate the location on the surface 86 where the centerline of the metacarpal-phalangeal ridge 64 will rest as the user operates the device. The remaining portion of the palm, including the thenar eminence and palm gutter, are filled with the continuous convex curve of the upper surface 86 in this region. That is, there are no voids or sudden changes in the curvature in this region, which might leave a gap or indentation beneath the user's palm thereby removing a corresponding amount of palm support that would have to be taken up with an increased static load on the users hand and arm muscles.

Small hands may engage the device 20 in a way so that the entire palm above the wrist is supported by the surface 86. Relatively larger hands will have substantially all of the palm so supported, except for the very base of the palm where the palm gutter joints the wrist. The base of the large palm fits comfortably over the rounded proximal end, and may rest on the desktop 25.

Having illustrated and described the principles of the present invention in a preferred embodiment, it should be apparent to those skilled in the art that the embodiment can be modified in arrangement and detail without departing from such principles. Accordingly, we claim as our invention all such embodiments as come within the scope and spirit-of the following claims and equivalents thereto.

We claim:

1. An input device, comprising:
   a body having an upper surface, an inner surface and an outer surface, a portion of the upper surface exposed for supporting at least part of the palm of a user's hand;
   a spherical member having a centerpoint and a radius and being rotatably mounted to the body to protrude from the upper surface and arranged for manipulation by the index finger of the user while the user's palm is supported on the upper surface;
   a depressible key mounted to the inner surface and exposed for contact by a user's thumb to depress the key while the user's palm is supported on the upper surface; and
   the device being configured and arranged so that the centerpoint of the spherical member is closer to the inner surface than to the outer surface and so that the inner surface is spaced no more than about a one and one-half radii distance from the spherical member, thereby to minimize the distance between the user's thumb and index finger as the spherical member is manipulated by the index finger and the key is contacted by the thumb.

2. The device of claim 1 wherein the inner surface is spaced about one radius from the spherical member.

3. The device of claim 1, further comprising:
   a wheel rotatably mounted to the body to protrude from the upper surface of the body and arranged for manipulation by the middle finger of the user while the user's palm is supported on the upper surface; and wherein
   the device is configured and arranged so that the distance from the wheel to the spherical member is no more than about one and one-half radii of the spherical member, thereby to minimize abduction required of the user's index and middle fingers as the spherical member is manipulated by the index finger and the wheel is manipulated by the middle finger.

4. The device of claim 3 wherein the distance from the wheel to the spherical member is no more than about one radius of the spherical member.

5. The device of claim 1 wherein the body includes a flat bottom portion for resting on a support surface, wherein the upper surface is curved, the curved upper surface having a crest defining the thickest part of the device as measured perpendicularly to the flat bottom portion, and wherein the spherical member is spaced about a one radius distance from the crest, thereby to facilitate support of the user's hand with the region underlying the second metacarpal-phalangeal joint upon the crest while the tip of the user's index finger rests on the spherical member.

6. The device of claim 5 wherein the crest is adjacent to the side surface and the thickness of the device gradually diminishes in a direction away from the crest and toward the outer surface, so that the user's metacarpal-phalangeal joint ridge is supported such that the user's forearm is in a neutral zone between pronation and supination.

7. The device of claim 6 wherein the upper surface from a location contiguous with the crest is disposed in a continuous slope in the direction away from the crest beneath the user's palm thereby to support the user's palm, including the thenar eminence and the palm gutter.

8. The device of claim 5 wherein the user may have a hand sized within a range of a $5^{th}$ percentile female to a $95^{th}$ percentile male of North American adults and wherein a hand sized within the range will be supported on the device with the crest substantially adjacent to and supporting the region underlying the second metacarpal-phalangeal joint of the hand while the tip of the user's index finger rests on the spherical member and while the thumb of the hand contacts the key.

9. The device of claim 8 further comprising:
   a wheel rotatably mounted to the body to protrude from the upper surface and arranged for manipulation by the middle finger of the user while the user's palm is supported on the upper surface; and wherein
   a hand sized within the range will be supported on the device with the middle finger touching the wheel.

10. The device of claim 5 wherein the uppermost part of the spherical member, as measured perpendicularly from the flat bottom portion, is substantially the same or lower than the crest.

11. A computer input device carrying at least one actuator that is operable for providing information to a connected computer, the device comprising:
    a body including:
      an inner surface;
      an outer surface substantially opposite the inner surface;
      a proximal portion adapted to support at least part of the palm of a user's hand while the user's hand is in an operating position;
      a distal portion adapted to carry at least one actuator for manipulation by a finger of the user while the user's palm is in the operating position;
      a flat bottom portion adapted for resting on a support surface; and
      a curved upper surface having a crest defining the thickest part of the device as measured perpendicularly to the bottom portion, wherein the crest is adjacent to the inner surface and closer to the inner surface than the outer surface, and wherein the thickness of the device gradually diminishes in a direction away from the crest and toward the outer surface, so that the user's metacarpal-phalangeal joint is supported with the palm in the operating position such that the user's forearm is in a neutral zone between pronation and supination; and
    a key mounted on the inner surface and having a contact surface adapted for contact with the thumb of the user while the user's palm is in the operating position.

12. The device of claim 11 wherein the key is depressible but normally disposed such that the contact surface is substantially flush with the inner surface.

13. The device of claim 12 wherein the key contact surface is slightly concave shaped.

14. The device of claim 11 further comprising a second key mounted on the inner surface adjacent to the other key and having a contact surface for contact with the thumb of the user while the user's palm is in the operating position.

15. The device of claim 14 wherein the second key is depressible but normally disposed such that the contact surface is substantially flush with the inner surface.

16. The device of claim 14 wherein the second key is depressible and the contact surface thereof is slightly concave shaped.

17. The device of claim 11 further comprising an actuator including a rotatable member carried by the distal portion and mounted to protrude from the upper surface and arranged for manipulation by the index or middle finger of the user while the user's palm is in the operating position.

18. The device of claim 17 wherein the rotatable member is spaced distally from the crest in the direction that the user's fingers extend while the user's palm is in the operating position, thereby to facilitate support of the user's hand with the crest adjacent to the region of the hand underlying the second metacarpal-phalangeal joint, while the tip of the user's index or middle finger rests on the rotatable member.

19. The device of claim 17 wherein the uppermost part of the rotatable member, as measured perpendicularly from the flat bottom portion, is at an elevation substantially the same as or lower than the crest.

20. The device of claim 17 wherein the rotatable member is a spherical member having a radius and being rotatably mounted to the body to protrude from the upper surface; and wherein the device is configured and arranged so that the inner surface is spaced no more than about a one and one-half radii from the spherical member, thereby to minimize the distance between the user's thumb and index finger as the spherical member is manipulated by the index finger and the key is contacted by the thumb.

21. The device of claim 20 wherein the inner surface is spaced no more than about one radius from the spherical member.

22. The device of claim 20, further comprising:

a wheel rotatably carried by the distal portion and mounted to protrude from the upper surface, and arranged for manipulation by the middle finger of the user while the user's palm is in the operating position; and wherein the device is configured and arranged so that the distance from the wheel to the spherical member is no more than about one and one-half radii of the spherical member, thereby to minimize abduction required of the user's index and middle fingers as the spherical member is manipulated by the index finger and the wheel is manipulated by the middle finger.

23. The device of claim 22 wherein the distance from the wheel to the spherical member is no more than about one radius of the spherical member.

24. The device of claim 20 wherein the user may have a hand sized within a range of a $5^{th}$ percentile female to a $95^{th}$ percentile male of North American adults and wherein a hand sized within the range will be supported on the device with the crest located for supporting the second metacarpal-phalangeal joint of the hand while the tip of the user's index finger rests on the spherical member and while the thumb of the hand contacts the key.

25. The device of claim 11 wherein the upper surface contiguous with the crest is disposed in a continuous slope in the direction away from the crest beneath the user's palm thereby to support the user's palm, including the thenar eminence and palm gutter.

26. The device of claim 22 wherein the wheel is spaced from the outer surface by an amount sufficient to permit the user's ring finger to rest on the upper surface between the wheel and the outer surface.

* * * * *